United States Patent [15] 3,635,212
Watanabe et al. [45] Jan. 18, 1972

[54] COATED ION MEASURING ELECTRODE

[72] Inventors: Hideo Watanabe; John E. Leonard, both of Fullerton, Calif.
[73] Assignee: Beckman Instruments, Inc.
[22] Filed: Mar. 3, 1969
[21] Appl. No.: 803,813

[52] U.S. Cl. .................................128/2, 204/1 T, 204/195
[51] Int. Cl. .........................................G01n 27/30
[58] Field of Search.....................128/2 R, 2.1 E; 204/195 G, 204/195 M, 195 B, 1 T; 128/2 E

[56] References Cited

OTHER PUBLICATIONS

John Krog et al., The Review of Scientific Instruments, vol. 30, No. 2, pp. 108– 109, Feb. 1959.

F. Kreuzer et al., Science, vol. 128, pp. 1,005– 1,006, Oct. 1958.

Primary Examiner—G. L. Kaplan
Attorney—Thomas L. Peterson and Robert J. Steinmeyer

[57] ABSTRACT

An ion measuring electrode is disclosed in which the ion sensitive barrier thereof is coated with reconstituted cellulose which is applied to the electrode in such a manner that the cellulose coating will remain on the electrode even after continued use thereof. The invention is particularly applicable to the coating of glass electrodes mounted in catheters utilized in the in vivo ion concentration measurements of body fluids.

9 Claims, 2 Drawing Figures

PATENTED JAN 18 1972  3,635,212

INVENTOR.
JOHN E. LEONARD
BY   HIDEO WATANABE

*Thomas L. Peterman*
ATTORNEY

COATED ION MEASURING ELECTRODE

CROSS-REFERENCE TO RELATED APPLICATION

This invention relates to and constitutes an improvement of one of the electrodes described in copending application of Leonard et al., entitled "METHOD AND APPARATUS FOR IN VIVO CONCENTRATION MEASUREMENTS," Ser. No. 676,971, filed Oct. 20, 1967, assigned to the assignee of the present application and now abandoned.

BACKGROUND OF THE INVENTION

1. Field of the Invention

This invention relates generally to ion measuring electrodes and, more particularly, to an ion measuring electrode having a cellulose coating on the ion sensitive barrier thereof and the method of forming such coating.

2. Description of the Prior Art

In recent years, the term in vivo ion concentration measurements of body fluids has referred to those types of analyses in which the ion concentration measurements were made directly upon body fluids that normally circulate entirely within its own protective skin, such as the blood, lymph, or other interstitial fluids. In these types of measurements, the ion measuring electrode, typically a pH glass electrode, is brought into direct contact with the body fluid, for example by contacting flowing blood in an artery. This is often accomplished by mounting the glass electrode in the end of a catheter and inserting the catheter in the artery of the subject being analyzed. A reference contact must also be made to the subject, such as by directly contacting the body fluid by an electrochemical reference electrode, such as a standard calomel reference electrode, or by contacting the skin of the subject by such an electrode.

There are two basic problems involved in making in vivo potentiometric measurements of body fluids and particularly on whole blood when the ion measuring electrode directly contacts the blood, as in the case of a catheter pH electrode. One of these problems is the effect of the surface of the glass electrode upon the blood itself. Blood is a complex colloidal mixture of an aqueous solution of ions, such as potassium, sodium and calcium ions, small molecules, such as urea and glucose, large molecules, ions of protein type and red cells which carry hemoglobin. When these substances come into contact with the surface of an ion sensitive bulb of a glass electrode, several events occur. One is called denaturization of protein which means that the protein molecules in blood are changed in such a way that they deposit and form a coating on the ion sensitive glass bulb of the measuring electrode. A second event which occurs is called hemolysis, which means that red cells in the blood which are carrying the hemoglobin rupture and, therefore, are destroyed. Thus the presence of a foreign substance such as the ion sensitive bulb of a glass electrode in a blood stream results in damage to the blood itself. Together with the aforementioned problem of denaturization is the additional danger that the blood coating on the ion sensitive bulb in the blood stream may form a clot of sufficient size that it will release from the electrode and be introduced into the patient's blood stream. The danger of clots in the blood stream of a living subject are well known in the medical field and, in some instances, can be fatal to the subject being examined.

The second basic problem involved in making in vivo potential measurements, wherein the ion sensitive barrier of a glass electrode or other measuring electrode is in direct contact with blood, is the impairment of the measuring characteristics of the electrode itself by the aforementioned decomposition products of blood. In this connection, it has been found that when a glass electrode becomes coated with products of decomposition of blood, the electrode no longer properly responds to the ions which it is intended to measure and, after a short period of time, the electrode becomes insensitive to changes in the concentration of the ion being measured. Consequently, precise in vivo potentiometric measurements have been capable of being performed in the past only over a relatively short period of time, on the order of a few minutes.

As described in the aforementioned Leonard et al., application, the above problems may be overcome by separating the ion sensitive barrier of the ion measuring electrode from the blood or other body fluid being analyzed by means of a hydrophilic membrane which is nonselective and semipermeable. The preferred form of such a membrane is cellulose, which is commonly called cellophane. In the case of a glass electrode mounted in the end of a catheter for in vivo ion concentration measurements, we once used a cellulose sheet which was held over the ion sensitive glass bulb of the electrode by means of an elastic band. However, it was found that when the catheter electrode was inserted into the artery of a living subject, due to folds in the cellulose sheet underneath the band, body fluid would accumulate near the ion sensitive bulb and thus impair its ion measuring characteristics. Moreover, since cellulose is extremely fragile, particularly when wetted, it would tear when placed under stress, as occurs when the catheter is pulled through an artery.

In order to overcome these problems, as disclosed in the aforementioned Leonard et al., application, the ion sensitive bulb may be coated with cellulose which is cast in situ. This was accomplished by dissolving cellulose in a reagent commonly known as Schweitzer reagent. This reagent may be either cupric hydroxide or copper sulfate dissolved in ammonia. When a glass electrode mounted in the end of a polymeric catheter tubing was immersed in the cellulose-reagent solution, a coating of such solution was provided over the ion sensitive bulb and the lower portion of the catheter. Cellulose was then reconstituted from the entire coating by acidifying the same. This was done by dipping the end of the catheter electrode into a dilute acid solution. As a result, there was provided a cellulose coating or film over both the ion sensitive bulb and the end portion of the catheter tubing. It has been found that catheter electrodes coated in this manner have a relatively limited life due to the fact that the reconstituted cellulose film thereon readily absorbs water and will peel off from the catheter tubing when placed under tension as when the catheter is withdrawn from an artery. As a result, the film will tear or pull off of the ion sensitive bulb and thus render the electrode ineffective for accurate ion concentration measurements. Thus, what is required is an improved method for providing a cellulose film on the ion sensitive barrier of ion measuring electrodes utilized for in vivo analysis of body fluids.

SUMMARY OF THE INVENTION

It is the principal object of the present invention to provide an improved ion measuring electrode in which a durable reconstituted cellulose coating is provided over the sensing end of the electrode.

Another object of the invention is to provide an improved method for forming a cellulose film on the ion sensitive barrier of an ion measuring electrode.

According to the principal aspect of the present invention, we have discovered quite unexpectedly that if the ion sensitive barrier of an ion measuring electrode is mounted in the end of an exposed metallic tube, rather than directly in the end of a polymeric catheter, and if a cellulose coating is provided only over the barrier and metal tube, and not the catheter, by reconstituting cellulose utilizing a Schweitzer reagent-cellophane mixture as described earlier, the resulting coating will have a substantially longer life and adhere to the metal tube far longer than if the coating extended over the catheter.

According to another aspect of the invention, we have found that if the end of a polymeric catheter having an ion sensitive barrier protruding therefrom is coated with a solution of a derivative of cellulose, and if only the coating on the barrier is treated to reconstitute cellulose therefrom, the remaining portion of the coating covering the catheter will firmly adhere thereto and the cellulose film covering the ion sensitive barrier will have a longer life than any other cellulose coatings known heretobefore.

Other objects, aspects and advantages will become apparent from the following description taken in connection with the accompanying drawing.

DESCRIPTION OF THE PREFERRED EMBODIMENT

Figure 1:
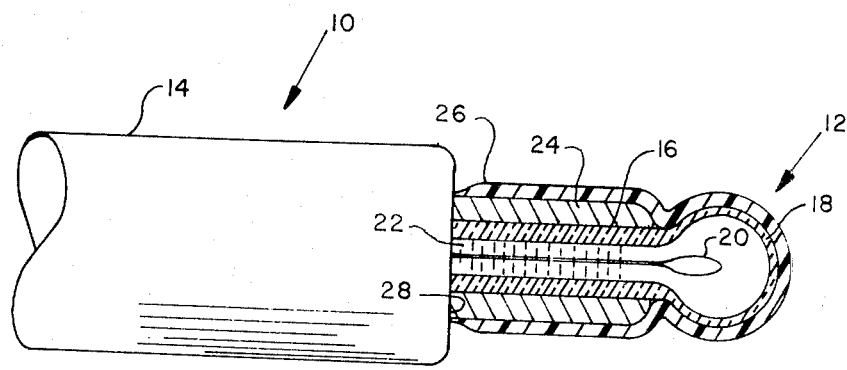
FIG. 1 is an enlarged longitudinal partial sectional view of the end of a catheter ion measuring electrode constructed in accordance with one embodiment of the invention.

Referring now to FIG. 1 in detail, there is shown an ion measuring electrode assembly, generally designated 10, comprising a glass electrode 12 mounted in a catheter tube 14. An example of a suitable catheter is a catheter catalogue No. 5400 sold by U.S. Catheter and Instrument Corp. This catheter is formed of a woven polyester, Dacron. The electrode 12 comprises a glass tube 16 which is closed at its lower end by an ion sensitive glass bulb 18. An internal half-cell 20 is positioned in the tube 16 for contacting a suitable solution 22 therein as well known in the art. The glass tube 16 is encased within a metal tube 24. Both the tubes 16 and 24 extend inwardly into the catheter 14. The outer surface of the metal tube 24 and ion sensitive bulb 18 are coated with reconstituted cellulose 26 in the manner which will be described later. As will be noted, this coating terminates at the end 28 of the catheter and does not extend over the surface of the catheter as has been the practice in the past.

A cellulose coating may be provided over an electrode as illustrated in FIG. 1 in the following manner. A Schweitzer reagent is prepared by dissolving cupric hydroxide in ammonia to provide a cupric ammonia complex. It is of course understood that copper sulfate or other suitable copper compounds may be used in order to form the cupric ammonia complex. Then cellulose is dissolved in this reagent until a saturated solution of cellulose is provided. It is understood, however, that the solution need not be saturated with cellulose. The amount of cellulose dissolved in the reagent determines the thickness of the cellulose film which will ultimately be provided over the ion sensitive bulb of the electrode. Thus, the amount of cellulose dissolved in the reagent is selected to provide the desired thickness of the film. In the case of one electrode which we constructed, the metal tube 24 was formed of stainless steel. However, it is believed that other metals could be employed if desired. Preferably the metal should be chemically inert. The electrode 12 is dipped into the cellulose-Schweitzer reagent mixture a distance sufficient to cover the metal tube 24 but just short of the end 28 of the catheter, and then the electrode is withdrawn from the solution to provide a thin coating over the ion sensitive bulb and the metal tube. Cellulose is then reconstituted from this coating by dipping the coated electrode into a 1 normal hydrochloric acid solution. It is of course understood that the coating on the electrode could be acidified by other means, such as by dipping the same in a dilute sulfuric acid. Moreover, any other means could be utilized for reconstituting the cellulose if desired. The acid neutralizes the ammonia complex in the coating on the electrode and thus reconstitutes cellulose from the coating. Thus, by this process there is provided a reconstituted or regenerated cellulose film or coating over the ion sensitive bulb and metal 16 tube supporting the bulb.

We have found that a reconstituted cellulose film formed on an electrode in the manner just described adheres to the metal tube 24 far more firmly and longer than if the film extended over the end of the polymeric catheter 14. It is believed that the adhesion of the film to the metal is due to the fact that there are microscopic irregularities in the surface of the metal tube which serve to hold the film thereon.

It has been found that a regenerated cellulose film provided on an electrode as described above can withstand up to four or five surgical procedures without destruction of the film or deterioration of the electrode response. Thus, these electrodes have a longer life and are more practical for use in living subjects than previous catheter electrodes provided with cast cellulose coatings, which would usually survive only one surgical procedure.

It is to be understood that the method described above is not limited to the use of Schweitzer reagent for forming the cellulose film. Any other method for forming cellulose in situ could be utilized if desired. For example, the well-known xanthate process could be utilized. This process differs from the Schweitzer process merely in the type of reagent utilized. The cellulose is reconstituted in similar manner by an acidification process.

Figure 2:
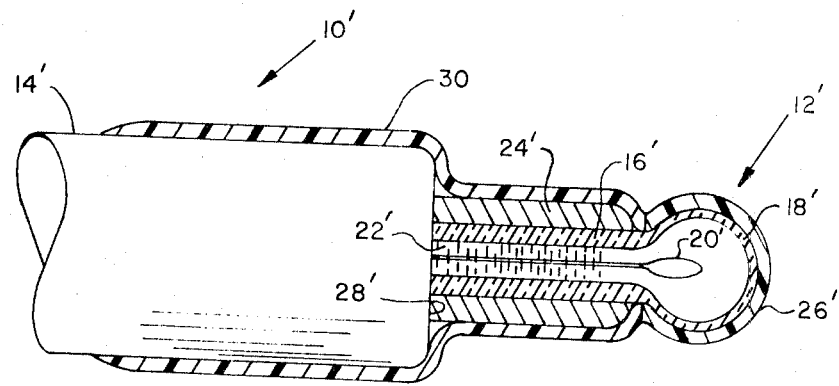
FIG. 2 is a view similar to FIG. 1 showing a second and the preferred embodiment of the invention.

Reference is now made to FIG. 2 of the drawing which shows the preferred embodiment of the invention. In this embodiment, the basic structure is as previously described and like numbers primed are used to indicate like or corresponding parts. In this embodiment, the reconstituted cellulose coating 26' covers only the ion sensitive bulb 18' of the glass electrode 12'. The remainder of the coating 30 which covers the metal tube 24' and the lower end of catheter 14' is a derivative of cellulose, such as cellulose acetate or cellulose nitrate (collodion). These cellulose esters are extremely tough and have good adhesive characteristics and thus adhere well to the polymeric surface of the catheter 14' as well as to the metal tube 24'. This is in contrast to reconstituted cellulose which readily absorbs water and does not adhere well at all to polymeric materials.

The coatings 26' and 30 may be provided on the electrode assembly illustrated in FIG. 2 in the following manner. Initially a derivative cellulose, such as cellulose acetate or cellulose nitrate, is dissolved in a suitable solvent. A suitable solvent for cellulose acetate is acetone while a suitable solvent for cellulose nitrate is an alcohol-ether mixture. It is, of course, understood that other derivatives of cellulose could be used if they are soluble in solvents. Again, the amount of cellulose added to the solvent is dependent upon the thickness of the coating which is desired over the ion sensitive bulb 18'. The coating is formed on the electrode assembly by dipping the catheter 14' into the solution of the derivative of cellulose. The assembly should be dipped into the solution sufficiently far that a coating of the solution extends up over the end of the catheter as shown in FIG. 2. The assembly is then withdrawn from the solution and then inserted into a second solution which is capable of hydrolytically deesterifying the cellulose nitrate or acetate film on the ion sensitive bulb 18'. This requires that only the bulb 18' be immersed in the second solution and not the coated metal tube 24' and end of the catheter 14'. If the derivative of cellulose employed in the coating 26' is cellulose acetate, the second solution may be an alcohol-ammonia mixture, such as 50 percent alcohol—50 percent concentrated ammonia hydroxide, for example. If the derivative of cellulose utilized is cellulose nitrate, the second solution may be an ammonia bisulfide solution. The second step reconstitutes the original cellulose on the ion sensitive bulb 18' yet leaves the cellulose ester film 30 covering the metal tube 24' and polymeric catheter 14'. Reconstituted cellulose coatings on electrodes of the type illustrated in FIG. 2 in which the cellulose ester was cellulose acetate have withstood as many as ten complete uses in surgical procedures without any damage occurring to the cellulose film on the bulb or the cellulose ester film on the meta tube and catheter. Moreover, electrodes of this type have been successfully used for continuous blood pH measurements in dogs over 50 total hours without need for recoating of the electrode assembly.

It can thus be appreciated that by the method described above with respect to the electrode assembly illustrated in FIG. 2, there is provided a continuous film over the lower end of the assembly, with that portion of the film covering the ion sensitive barrier 18' being reconstituted cellulose and the remainder of the film being an ester of cellulose which is very durable and has good adhesive qualities.

While the present invention has been described specifically in relation to coating of ion sensitive glass bulbs, the advantages obtained by the invention are applicable to other forms of ion sensitive barriers, for example, silver-silver chloride or silver chloride barriers which are employed for measuring the chloride ion concentration of solutions and are subject to the same problems discussed previously in connection with ion sensitive glass barriers.

Although several embodiments of the invention have been disclosed herein for purposes of illustration, it will be understood that the embodiments disclosed may be subjected to various changes, modifications and substitutions without departing from the spirit and scope of the invention as defined by the appended claims.

We claim:

1. In an electrode assembly for ion concentration measurements having an ion sensitive barrier mounted at the end of a tubular member and a coating of reconstituted cellulose covering said barrier, the improvement which comprises:
    a second coating of a derivative of cellulose covering the portion of said tubular member adjacent to said barrier; and
    said second coating being continuous with said reconstituted cellulose coating.

2. An electrode assembly as set forth in claim 1 wherein said barrier is formed of ion sensitive glass.

3. An electrode assembly as set forth in claim 2 wherein:
    said tubular member comprises a catheter formed of a polymeric material; and
    said derivative of cellulose is a substance that adheres firmly to said catheter even when wetted and subjected to tension.

4. An electrode assembly as set forth in claim 1 wherein said derivative of cellulose is selected from the group consisting of cellulose nitrate and cellulose acetate.

5. An electrode assembly as set forth in claim 1 wherein a section of said portion of said tube is formed of a polymeric material.

6. In an electrode assembly for ion concentration measurements having an ion sensitive barrier mounted at the end of a tubular member and a coating of reconstituted cellulose covering said barrier, the improvement which comprises:
    said tubular member comprising a metal tube mounted in the end of an nonconductive tube; and
    said coating of reconstituted cellulose covering only said barrier and metal tube.

7. An electrode assembly as set forth in claim 6 wherein said nonconductive tube is a catheter formed of a polymeric material.

8. An electrode assembly as set forth in claim 7 wherein a glass tube is mounted within said metal tube and said ion sensitive barrier is formed of ion sensitive glass and is sealed to said glass tube.

9. An electrode assembly as set forth in claim 6 wherein said metal tube is formed of substantially chemically inert metal.

* * * * *